Patented Sept. 30, 1930

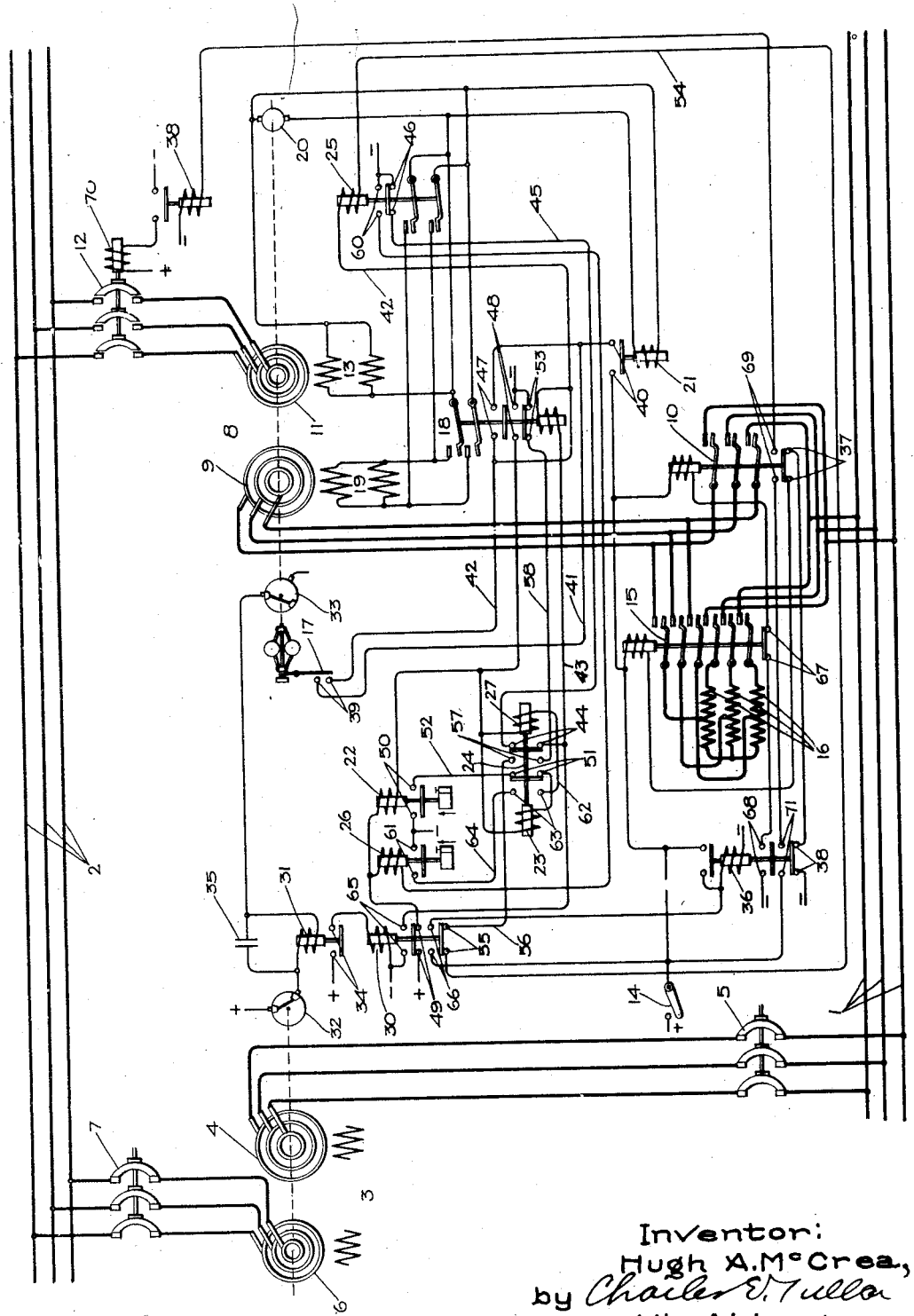

1,777,175

UNITED STATES PATENT OFFICE

HUGH A. McCREA, OF SCHENECTADY, NEW YORK, ASSIGNOR TO GENERAL ELECTRIC COMPANY, A CORPORATION OF NEW YORK

AUTOMATIC CONTROL ARRANGEMENT

Application filed March 16, 1929. Serial No. 347,586.

My invention relates to automatic control arrangements and particularly to an arrangement for synchronizing two synchronous frequency converters and its object is to provide an improved arrangement for accomplishing this result.

In systems of electric distribution in which two electric systems of different frequencies are interconnected by a plurality of synchronous frequency converters, it is very essential, in order to operate satisfactorily two synchronous converters in parallel, that the rotors of the two frequency converters have such a space relation with respect to each other that the no-load voltages across the corresponding generator terminals of the two converters, when they are connected in parallel, are in synchronism.

In accordance with my invention, I accomplish this result by connecting to its respective system one of the synchronous machines of a synchronous frequency converter, which it is desired to place in operation, so that the converter runs at synchronous speed, and then automatically reverse the excitation of the energized synchronous machine of the converter being started until the angular displacement between the rotor of the converter being started and the rotor of a converter which is in operation, is less than a predetermined amount, that is, when the rotors of the two converters are in space phase relation. When this predetermined space relation occurs, the other synchronous machine of the frequency converter being started is then connected to its respective system.

My invention will be better understood from the following description taken in connection with the accompanying drawing and its scope will be pointed out in the appended claims.

Referring to the drawing which shows diagrammatically a system of electric distribution embodying my invention, 1 and 2 represent two alternating current systems of different frequencies, which are connected together by a suitable synchronous frequency converter 3 comprising a synchronous machine 4 which is connected to the system 1 by means of a suitable circuit breaker 5 and which is direct connected to a synchronous machine 6 connected to the system 2 by means of a suitable circuit breaker 7. 8 represents another synchronous frequency converter comprising a synchronous machine 9 which is adapted to be connected to the system 1 by means of a suitable circuit breaker 10 and a direct connected synchronous machine 11 which is adapted to be connected to the system 2 by means of a suitable circuit breaker 12.

For effecting the starting of frequency converter 8 and the connection thereof between the systems 1 and 2 while the frequency converter 3 is interconnected therebetween, I provide a suitable control switch 14 which is arranged when closed to effect the closing of a starting switch 15. The switch 15 when closed connects a suitable compensator 16 to the system 1 and to the armature winding of the synchronous machine 9 so that the machine has a relatively low voltage impressed upon its armature winding to effect the starting thereof. As soon as the speed of the converter 8 increases above a predetermined value, a suitable speed responsive device, such as a centrifugally operated speed switch 17, operates to effect the closing of a field switch 18 to connect the field windings 19 of the synchronous machine 9 to a suitable source of direct current such as an exciter 20 direct connected to the converter 8. As soon as the field switch 18 is closed and direct current flows through the field winding 19 the synchronous machine 9 is pulled into synchronism with the system 1. The closing of the field switch 18 is also controlled by a suitable voltage relay 21 which is responsive to the voltage of the exciter 20 so that the field winding 19 cannot be energized by the exciter until the voltage thereof is above a predetermined value.

When the synchronous machine 9 is provided with a plurality of pairs of field poles there is a possibility of the machine 9 pulling into synchronism in as many different positions of the rotor of the machine 9, with respect to a predetermined position of the rotor of the converter 3, as there are pairs of poles on the machine 9. For example, assume that the frequencies of the systems 1 and 2 are 60 and 25 cycles respectively and that the synchronous machines 4 and 9 have 24 poles and the synchronous machines 6 and 11 have 10 poles. If we assume that the exciter polarity is fixed so that whenever the switch 18 is closed the current through the field windings 19 always flows in a predetermined direction, the synchronous machine 9 can pull into synchronism in twelve different positions with respect to the position of the rotor of the converter 3. There is, however, only one of these twelve positions of the rotor of the machine 9 in which the voltage of the synchronous machine 11, the field windings 13 of which are energized by the exciter 20, is in phase coincidence with the system 2 and when the rotor of the converter 8 is in the proper position to cause the machine 11 to be in synchronism with the system 2, the rotors of the two converters are said to be in space phase relation.

In accordance with my invention, I provide an arrangement for continuously reversing the excitation of the synchronous machine 9, after it has been started and has reached synchronous speed until the rotors of the two converters 3 and 8 have been brought into space phase relation. As shown in the drawing, I accomplish this result by providing a time relay 22 which is arranged to be energized when the field switch 18 is closed and the rotors of the two converters are not in space phase relation. After the time relay 22 has been energized for a predetermined time, the relay effects the energization of the winding 23 of a field reversing switch 24. The winding 23, when energized, is arranged to effect the opening of the field switch 18 and the closing of another field switch 25 which when closed connects the field windings 19 to the exciter 20 so that the current through the field windings is reversed. The field switch 25 when closed effects the energization of another time relay 26 which after a predetermined time affects the energization of another winding 27 of the field reversing switch 24 to effect the operation of the switch 24 to effect the opening of the field switch 25 and the closing of the field switch 18. Preferably the time setting of the time relay 26 is only long enough to insure that the rotor of the machine 9 has sufficient time to slip a pole because if both converters are excited from sources having definite polarities it is impossible for the converters 3 and 8 to be in space phase relation when the field switch 25 is closed. Therefore, each time the excitation of the machine 9 is reversed, a double reversal is effected in order to cause the rotor thereof to slip a pair of poles and thereby facilitate the synchronizing operation.

In order to stop further operation of the field reversing arrangement for the machine 9 after rotors of the two converters have been brought into space phase relation, I provide a relay 30 which is so connected and arranged that when the rotors are in space phase relation the relay 30 is energized and the circuits of the time relays 20 and 26 are open so that they are rendered inoperative to effect further opening of the field switch 18 and closing of the field switch 25.

In order to effect the energization of the control relay 30 when the rotors of the converters 3 and 8 are in space phase relation, I provide a control relay 31 which is connected to suitable contact making devices 32 and 33 respectively mounted on the shafts of the converters 3 and 8. The contact making devices 32 and 33 may be of any suitable construction, examples of which are well known in the art whereby the energizing circuit for the control relay 31 is completed across a suitable source of current only when the respective converter rotors are in predetermined positions. In the arrangement shown, the devices 32 and 33 are arranged so that they complete the circuit of the control relay 31 when the converters are in space phase relation. In order to take care of the slight difference in the relative positions of the two rotors due to the load on the converter 3, when the converter 8 is being synchronized, the contact making devices 32 and 33 are also designed so that not only do they effect the energization of the control relay 31 when the two rotors are in exact space phase relation but also when there is a predetermined small angular displacement between the two rotors due to load on the converter 3 which is in service. Therefore, it is to be understood, that in the following description and claims the expression that the rotors are in "space phase relation" does not mean that the rotors are in exact space phase relation but means that the space relation of the rotors is such that if machines 6 and 11 were connected to equal and similar loads, the voltages of the machines 6 and 11 would be in synchronism.

With the arrangement shown in the drawing, it will be observed that when the rotors are in space phase relation the energizing circuit of the control relay 31 is completed once every revolution of the converter rotors. In order that the relay 31 may maintain its contacts 34 closed when the circuit of the relay is intermittently completed by the rotors when they are in space phase relation, I provide a condenser 35 in shunt thereto.

The control relay 30 when energized in response to the energization of the control relay 31 also effects the energization of a transfer relay 36 to effect the opening of the starting switch 15 and the closing of the running switch 10. The energization of the transfer relay 36 also is arranged to control the energization of a control relay 38 which, in turn, is arranged to effect the closing of the switch 12 to connect the synchronous machine 11 to the system 2. Any suitable means, examples of which are well known in the art, may also be provided for controlling the closing of the switch 12 so that it can be closed only when a predetermined phase relation exists between the voltages of the machine 11 and the circuit 8. The converter 8 may also be provided with suitable rotor adjusting means, examples of which are well known in the art, whereby the amount of load the converter assumes when the switch 12 closes may be adjusted at will.

The operation of the arrangement shown in the drawing is as follows: When the converter 3 is connected between the systems 1 and 2 and it is desired to place the converter 8 in operation, the control switch 14 is closed. The closing of this control switch 14 completes across a suitable control circuit an energizing circuit for the winding of the starting switch 15. This energizing circuit also includes contacts 37 on the running switch 10 and contacts 38 on the transfer relay 36. The closing of the starting switch 15 connects the compensator 16 to the system 1 and the low voltage taps of the compensator to the armature winding of the machine 9 so that a low voltage is impressed on the armature winding of machine 9 to effect the starting thereof as an induction motor.

When the machine 9 reaches substantially synchronous speed the speed switch 17 closes its contacts 39 and completes an energizing circuit for the winding of the field switch 18 so that the field windings 19 of the machine 9 are energized from the exciter 20 to pull the machine 9 into synchronism with the system 1. The energizing circuit for the winding of the field switch 18 is from one side of a suitable control circuit through the control switch 14, contacts 40 of the relay 21 if the exciter voltage is above a predetermined value, conductor 41, contacts 39 of the speed responsive device 17, conductor 42, winding of field switch 18, conductor 43, contacts 44 of the field reversing switch 24, conductor 45, contacts 46 of field switch 25 to the other side of the control circuit. Field switch 18 by closing its auxiliary contacts 47 completes a locking circuit for its energizing winding which is independent of the contacts 39 of the speed responsive device 17. Field switch 18 by closing its contacts 48 completes through the contacts 49 of a control relay 30 an energizing circuit for the time relay 22. If the rotors of the converters are not in space phase relation after the field switch 18 has been closed, the time relay 22 operates after a predetermined time to close its contacts 50 and completes an energizing circuit for the winding 23 of the field reversing switch 24. This energizing circuit is from one side of the control circuit through control switch 14, contacts 40 of relay 21, conductor 41, winding 23 of the field reversing switch 24, contacts 51 of the field reversing switch 24, conductor 52, contacts 50 of time relay 22 to the other side of the control circuit. Field reversing switch 24 by opening its contacts 44 interrupts the heretofore traced circuit for the winding of the field switch 18 so that this switch opens and disconnects the field windings 19 from the exciter 20. The closing of the auxiliary contacts 53 on the field switch 18 completes an energizing circuit for the winding of the field switch 25 so that the field winding 19 is connected to the exciter so that the current through the field windings 19 is reversed. This energizing circuit is from one side of the control circuit through control switch 14, contacts 40 of relay 21, conductor 41, contacts 39 of the speed responsive device 17, conductor 42, winding of field switch 25, conductor 54, contacts 55 of control relay 30, conductor 56, contacts 57 of the field reversing switch 24, conductor 58, contacts 53 of the field switch 18 to the other side of the control circuit. Field switch 25 by closing its auxiliary contacts 60 completes through the contacts 49 of the control relay 30 an energizing circuit for the time relay 26. After the time relay 26 has been energized for a predetermined time it closes its contacts 61 and completes an energizing circuit for the winding 27 of the field reversing switch 24. This energizing circuit is from one side of the control circuit through the control switch 14, contacts 40 of the relay 21, conductor 41, winding 27 of the field reversing switch 24, conductor 62, contacts 63 of the field reversing switch 24, conductor 64, contacts 61 of the time relay 26 to the other side of the control circuit. The winding 27 when energized is arranged to effect the opening of the contacts 57 and 63 and the closing of the contacts 44 and 51 of the field reversing switch 24 so that the heretofore described energizing circuit for the winding of the field switch 25 is opened and the energizing circuit for the winding of the field switch 18 is subsequently closed.

It will be observed, therefore, that if the converters are not in space phase relation, a double reversal of the field excitation of the machine 9 is effected so that the rotor of the machine 9 slips the distance of two field poles. This operation continues until the rotor of the converter 8 is brought into space phase relation with the rotor of the converter 3. When this condition occurs, the contact making devices 32 and 33 operate to complete the circuit of the control relay 31 during each revolution of the converters so that the control relay 31 is energized and closes its contact 34. The condenser 35 is designed so that during the portion of each revolution of the converter rotors during which the energizing circuit of the control relay 31 is interrupted, the condenser 35 discharges through the winding of the relay 31 so that the relay maintains its contacts 34 closed. The closing of the contacts 34 of the control relay 31 completes an energized circuit for the control relay 30. Relay 30 when energized opens its contacts 49 in the circuits of the time relays 22 and 26 so that these relays cannot be energized to effect the opening and closing of the field switches 18 and 25 to reverse the field excitation of the machine 9. Control relay 30 by closing its contacts 65 completes an energizing circuit for the winding of the field switch 18 so as to insure that this field switch is closed when the converters are in space phase relation. The relay 30 by closing its contacts 66 completes through the control switch 14 an energizing circuit for the winding of the transfer relay 36. The transfer relay 36 when energized opens its contacts 38 in the heretofore traced circuit for the operating winding of the starting switch 15 so that the switch 15 is open to disconnect the compensator 16 from the system 1 and the armature winding of the machine 9. The starting switch 15 by closing its auxiliary contacts 67 completes an energizing circuit for the running switch 10 so that the armature winding of the machine 9 is connected directly to the system 1. This energizing circuit is from one side of the control circuit through control switch 14, operating winding of the running switch 10, auxiliary contacts 67 on the starting switch 15 and contacts 68 of the transfer relay 36 to the other side of the control circuit. As soon as the running switch 10 closes its auxiliary contacts 69 complete an energizing circuit for the control relay 38 to effect the energization of the closing coil 70 of the switch 12. The energizing circuit of the control relay 38 is from one side of the control circuit through control switch 14, contacts 71 of the transfer relay 36, contacts 69 of the running switch 10 and the coil of the control relay 38 to the other side of the control circuit. The closing coil 70 when energized closes the switch 12 to connect the machine 11 to the system 2.

While I have shown and described my invention in connection with an arrangement in which field reversing is done while the alternating current starting switch 15 is closed, it is obvious that my invention is not limited to reversing the field excitation at that time.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, a source of alternating current, a synchronous dynamo electric machine connected to said source, a second synchronous dynamo electric machine, means for connecting said second machine to said source so that a relatively low voltage is impressed on said second machine, means for connecting said second machine to said source so that a relatively high voltage is impressed on said second machine, means responsive to the relative positions of the rotors of said machines while said second machine is connected to said source so that a relatively low voltage is impressed on said second machine for reversing the excitation of said second machine, and means responsive to a predetermined space relation between the rotors of said machines for effecting the opening of said first mentioned connecting means and the closing of the second mentioned connecting means.

2. In combination, two alternating current circuits, a frequency converter connected between said circuits, a second frequency converter connected to one of said circuits, means for connecting said second frequency converter to the other of said circuits, and means responsive to the relative positions of the rotors of said converter for automatically reversing the excitation of said second converter until said rotors are in space phase relation.

3. In combination, two alternating current circuits, a frequency converter connected between said circuits, a second frequency converter connected to one of said circuits, means for connecting said second frequency converter to the other of said circuits, and means responsive to the relative positions of the rotors of said converter for automatically reversing the excitation of said second converter with predetermined time intervals between successive reversals until said rotors are in space phase relation and then for effecting the operation of said connecting means.

4. In combination, two alternating current circuits, a frequency converter connected between said circuits, a second frequency converter, means for connecting said second converter to one of said circuits so that a relatively low voltage is impressed on said second converter, means for connecting said second converter to said one of said circuits so that a relatively high voltage is impressed on said second converter, means responsive to the relative positions of the rotors of said converters for reversing the excitation of said second converter while said second converter is connected so that a relatively low voltage is impressed thereon, and means responsive to a predetermined space relation between the rotors of said converters for effecting the opening of said first mentioned connecting means and the closing of said other connecting means.

5. In combination, two alternating current circuits, a frequency converter connected between said circuits, a second frequency converter, means for connecting said second converter to one of said circuits so that a relatively low voltage is impressed on said second converter, means for connecting said second converter to said one of said circuits so that a relatively high voltage is impressed on said second converter, means responsive to the relative positions of the rotors of said converters while said second converter is connected so that a relatively low voltage is impressed thereon for reversing the excitation of said second converter, means responsive to a predetermined relation between corresponding points on the rotors of said converters for effecting the opening of said first mentioned connecting means and the closing of said other connecting means, and means responsive to the closing of said last mentioned connecting means for connecting said second converter to the other of said circuits.

6. In combination, two alternating current circuits, a frequency converter connected between said circuits, a second frequency converter, means for connecting said second converter to one of said circuits so that a relatively low voltage is impressed on said second converter, means for connecting said second converter to said one of said circuits so that a relatively high voltage is impressed on said second converter, means responsive to the relative positions of the rotors of said converters while said second converter is connected so that a relatively low voltage is impressed thereon for reversing the excitation of said second converter, means responsive to a predetermined relation between corresponding points on the rotors of said converters for effecting the opening of said first mentioned connecting means and the closing of said other connecting means and the connection of said second converter to the other of said circuits.

7. In combination, two alternating current circuits, a frequency converter comprising two mechanically connected synchronous dynamo electric machines respectively connected to said circuits, a second frequency converter comprising two mechanically connected synchronous dynamo electric machines, means for connecting one of said last mentioned machines to one of said circuits to effect the synchronous operation of said one of said last mentioned machines, and means responsive to the relative positions of the rotors of said converters for reversing the excitation of said one of said last mentioned machines to bring the other of said last mentioned machines into synchronism with the other of said circuits.

In witness whereof, I have hereunto set my hand this 15th day of March, 1929.

HUGH A. McCREA.